US011149209B2

(12) United States Patent
López Quintela et al.

(10) Patent No.: US 11,149,209 B2
(45) Date of Patent: Oct. 19, 2021

(54) PROCESS FOR OXIDATION OF ORGANOSULFUR COMPOUNDS

(71) Applicants: UNIVERSIDADE DE SANTIAGO DE COMPOSTELA, Santiago de Compostela-A Coruna (ES); NANOGAP SUB-NM-POWDER, S.A., A Coruna (ES)

(72) Inventors: Manuel Arturo López Quintela, Santiago de Compostela-A Coruna (ES); David Buceta Fernández, Santiago de Compostela-A Coruna (ES)

(73) Assignees: UNIVERSIDADE DE SANTIAGO DE COMPOSTELA, A Coruna (ES); NANOGAP SUB-NM-POWDER, S.A., A Coruna (ES)

( * ) Notice: Subject to any disclaimer, the term of this patent is extended or adjusted under 35 U.S.C. 154(b) by 0 days.

(21) Appl. No.: 16/632,623

(22) PCT Filed: Jul. 20, 2018

(86) PCT No.: PCT/EP2018/069825
§ 371 (c)(1),
(2) Date: Jan. 21, 2020

(87) PCT Pub. No.: WO2019/016391
PCT Pub. Date: Jan. 24, 2019

(65) Prior Publication Data
US 2020/0216762 A1 Jul. 9, 2020

(30) Foreign Application Priority Data
Jul. 21, 2017 (EP) ..................... 17382482

(51) Int. Cl.
*C10G 27/04* (2006.01)
*B01J 35/02* (2006.01)
*B01J 23/52* (2006.01)
*B01J 23/72* (2006.01)
*B82Y 30/00* (2011.01)

(52) U.S. Cl.
CPC ............ *C10G 27/04* (2013.01); *B01J 35/023* (2013.01); *B01J 23/52* (2013.01); *B01J 23/72* (2013.01); *B82Y 30/00* (2013.01); *C10G 2300/202* (2013.01); *C10G 2300/206* (2013.01); *C10G 2300/70* (2013.01)

(58) Field of Classification Search
CPC .................................................... C10G 27/04
See application file for complete search history.

(56) References Cited

U.S. PATENT DOCUMENTS

2010/0025301 A1  2/2010  Borgna et al.
2014/0203213 A1  7/2014  Thalappil et al.

FOREIGN PATENT DOCUMENTS

| EP | 1914196 A1 * | 4/2008 | ............. A61K 33/26 |
| EP | 1914196 A1 | 4/2008 | |
| WO | WO2007017550 A1 | 2/2007 | |
| WO | WO2014068163 A1 | 5/2014 | |

OTHER PUBLICATIONS

M. M. Shoshani and Samuel A. Johnson, Facile Deep and Ultradeep Hydrodesulfurization by the [(iPr3P)Ni]5H6 Cluster Compared to Mononuclear Ni Sources, 54 Inorg. Chem. 11977-11985 (2015).*
A. Corma et al., Exceptional Oxidation Activity with Size-Controlled Supported Gold Clusters of Low Atomicity, 5 Nat. Chem.775-781 (2013).*
A. A. Olajire, Green Synthesis of Bimetallic Pt@Cu Nanostructures for Catalytic Oxidative Desulfurization of Model Oil, 7 J. Nanostruct. Chem. 159-170 (2017).*
Bittner, A.M., "Clusters on Soft Matter Surfaces", "Surface Science Reports", 2006, pp. 383-428, vol. 61.
Castleman, A.W., et al., "Clusters, Superatoms, and Building Blocks of New Materials", "J. Phys. Chem C", 2009, pp. 2664-2675, vol. 113.
Corma, A., et al., "Aerobic Oxidation of Thiols to Disulfides by Heterogeneous Gold Catalysts", "Chem. Sci.", 2012, pp. 398-404, vol. 3.
Corma, A., et al., "Exceptional Oxidation Activity with Size-Controlled Supported Gold Clusters of Low Atomicity", "Nature Chemistry", Aug. 4, 2013, pp. 1-6.
Harris, P., "Growth and Structure of Supported Metal Catalyst Particles", "International Materials Review", 1995, pp. 97-115, vol. 40, No. 3.
Huang, J., et al., "Propene Epoxidation with Dioxygen Catalyzed by Gold Clusters", "Angew. Chem. Int. Ed.", 2009, pp. 7862-7866, vol. 48.
Huseyinova, S. et al., "Synthesis of Highly Stable Surfactant-free Cu Clusters in Water", "The Journal of Physical Chemistry", Jan. 20, 2016, pp. 1-23.
Hussain, A., "Liquid Phase Desulfurization of Hydrocarbon Fuels Under Ambient Conditions Using Regenerable Mixed Oxide Supported Silver Adsorbents", "Dissertation: Auburn University", May 4, 2014, pp. 1-192.
Mcbride, K., et al., "DFT Investigation of MoS2 Nanoclusters Used as Desulfurization Catalysts", "International Journal of Quantum Chemistry", 2009, pp. 3570-3582, vol. 109.
Olajire, A., et al., "Green Synthesis of Bimetallic Pt@Cu Nanostructures for Catalytic Oxidative Desulfurization of Model Oil", "J. Nanostruct Chem", 2017, pp. 159-170, vol. 7.
Ouyang, R., et al., "Atomistic Theory of Ostwald Ripening and Disintegration of Supported Metal Particles Under Reaction Conditions", "J. Am. Chem. Soc.", 2013, pp. 1760-1771, vol. 135.

(Continued)

*Primary Examiner* — Randy Boyer
(74) *Attorney, Agent, or Firm* — Hultquist, PLLC; Steven J. Hultquist

(57) ABSTRACT

The present invention refers to process for oxidation of organosulfur compounds comprising metal AQCs having between 5 and 13 metal atoms as catalyst. Additionally, the present invention refers to the use of the metal AQCs having between 5 and 13 metal atoms as catalyst in the oxidation of organosulfur compounds and to a chemical composition comprising organosulfur compounds and metal AQCs having between 5 and 13 metal atoms.

10 Claims, 3 Drawing Sheets

(56) References Cited

OTHER PUBLICATIONS

Figure 1:
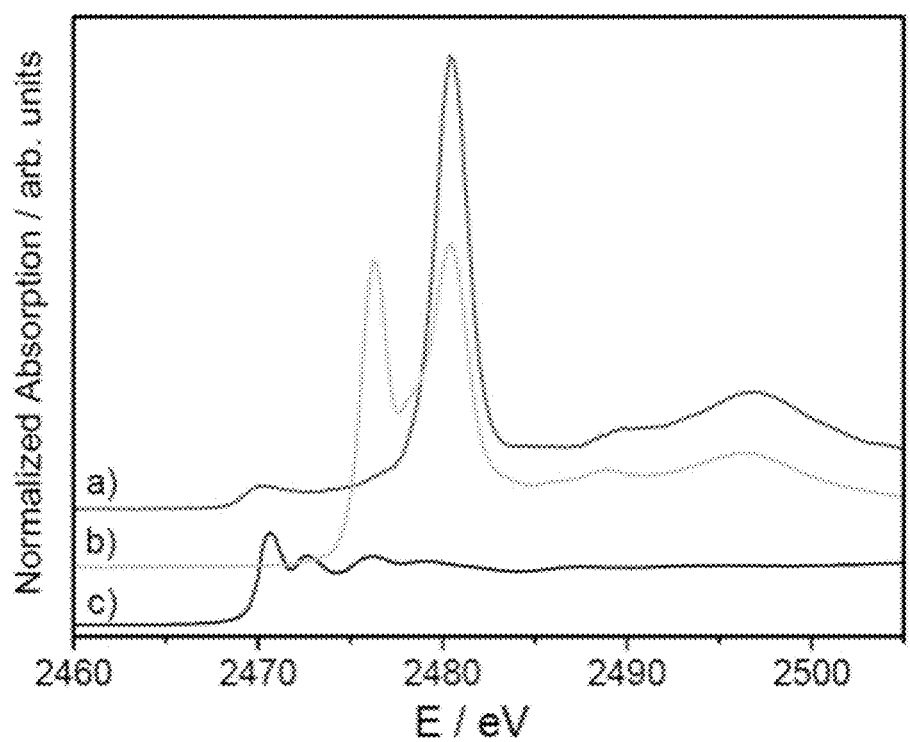

Santiago Gonzalez, B., et al., "One Step Synthesis of the Smallest Photoluminescent and Paramagnetic PVP-Protected Gold Atomic Clusters", "Nano Letters", 2010, pp. 4217-4221, vol. 10.

Santiago Gonzalez, B., et al., "Single Step Electrochemical Synthesis of Hydrophpilic/Hydrophobic Ag5 and Ag6 Blue Luminescent Clusters", "Nanoscale", 2012, pp. 7632-7635, vol. 4.

Schaaff, T.G., et al., "Giant Gold-Glutathione Cluster Compounds: Intense Optical Activity in Metal-Based Transitions", "J. Phys. Chem. B", , pp. 2630-2641, vol. 104, (2000).

Selva, J., et al., "Silver Sub-Nanoclusters Electrocatalyze Ethanol Oxidation and Provide Protection Against Ethanol Toxicity in Cultured MammalianCells", "J. Am. Chem. Soc.", 2010, pp. 6947-6954, vol. 132.

Vilar-Vidal, N., et al., "Electrochemical Synthesis of Very Stable Photoluminescent Copper Clusters", "J. Phys. Chem. C", 2010, pp. 15924-15930, vol. 114.

Vilar-Vidal, N., et al., "Size Dependent Catalytic Activity of Reusable Subnanometer Copper(0) Clusters", "ACS Catalysis", 2012, pp. 1693-1697, vol. 2.

Vilar-Vidal, N., et al., "Green Emitter Copper Clusters as Highly Efficient and Reusable Visible Degradation Photocatalysts", "Small", 2014, pp. 1-5.

Yamaguchi, N., "Hydrodesulfurization Technologies and Costs", "The William and Flora Hewlett Foundation Workshop", May 29, 2003, pp. 1-16.

Yamamoto, Y., et al., "Direct Observation of Ferromagnetic Spin Polarization in Gold Nanoparticles", "Physical Review Letters", Sep. 10, 2004, pp. 116801-1-116801-4, vol. 93, No. 11.

Yan, X., et al., "Oxidative Desulfurization of Diesel Oil Over Ag-Modified Mesoporous HPW/SiO2 Catalyst", "Journal of Fuel Chemistry and Technology", 2009, pp. 318-323, vol. 37, No. 3.

Zhang, S., et al., "Mechanistic Investigations on the Adsorption of Thiophene Over Zn3NiO4 Bimetallic Oxide Cluster", "Applied Surface Science", 2014, pp. 10148-10153, vol. 258.

Zhao, D., et al., "Enhancement of Pt Utilization in Electrocatalysts by Using Gold Nanoparticles", "Angew. Chem. Int. Ed.", 2006, pp. 4955-4959, vol. 45.

Zheng, J., et al., "Highly Flourescent, Water-Soluble, Size-Tunable Gold Quantum Dots", "Physical Review Letters", Aug. 13, 2004, pp. 77402-1-77402-4, vol. 93, No. 7.

Zhu, Y., et al., "Thiolate-Protected Aun Nanoclusters as Catalysts for Selective Oxidation and Hydrogenation Processes", "Adv. Mater.", 2010, pp. 1915-1920, vol. 22.

Zhu, Y., et al., "Catalysis Opportunities of Atomically Precise Gold Nanoclusters", "J. Mater. Chem.", 2011, pp. 6793-6799, vol. 21.

* cited by examiner

PROCESS FOR OXIDATION OF ORGANOSULFUR COMPOUNDS

CROSS-REFERENCE TO RELATED APPLICATIONS

This application is a U.S. national phase under the provisions of 35 U.S.C. § 371 of International Patent Application No. PCT/EP18/69825 filed Jul. 20, 2018, which in turn claims priority of European Patent Application No. EP17382482.2 filed Jul. 21, 2017. The disclosures of such international patent application and European priority patent application are hereby incorporated herein by reference in their respective entireties, for all purposes.

FIELD OF THE INVENTION

The present invention relates to the field of desulfurization of fossil fuels and, more particularly, to the field of desulfurization of fossil fuels by oxidation of organosulfur compounds.

BACKGROUND

Fossil fuels are the largest and most widely used source of power in the world, offering high efficiency, proven performance, and relatively low prices. There are many different types of fossil fuels, ranging from petroleum fractions to coal, tar sands, and shale oil, with uses ranging from consumer uses such as automotive engines and home heating to commercial uses such as boilers, furnaces, smelting units and power plants.

Unfortunately, most fossil fuels contain sulfur, typically in the form of organic sulfur compounds. The sulfur causes corrosion in pipeline, pumping and refining equipment, as well as the premature failure of combustion engines. Sulfur also poisons the catalysts used in the refining and combustion of fossil fuels. By poisoning the catalytic converters in automotive engines, sulfur is responsible in part for the emissions of oxides of nitrogen ($NO_x$) from diesel-powered trucks and buses. Sulfur is also responsible for the particulate (soot) emissions from trucks and buses since high-sulfur fuels tend to degrade the soot traps that are used on these vehicles. One of the greatest problems caused by sulfur compounds is their conversion to sulfur dioxide when the fuel is burned. When released to the atmosphere results in acid rain, sulfur dioxide causes acid deposition that is harmful to agriculture, wildlife, and human health.

The principal method of fossil fuel desulfurization in the prior art is hydrodesulfurization ("Hydrodesulfurization Technologies and Costs". N. Yamaguchi, Trans Energy Associates, William and Flora Hewlett Foundation Sulfur Workshop, Mexico City, May 29-30, 2003), by which the fossil fuel is reacted with hydrogen gas at elevated temperature (500-800° C.) and high pressure in the presence of a catalyst. This causes the reduction of organic sulfur to gaseous $H_2S$, which is then oxidized to elemental sulfur by the Claus process. A considerable amount of unreacted $H_2S$ remains however, creating serious health hazards. Another difficulty with hydrodesulfurization is that when it is performed under the more strict conditions needed to achieve the lower sulfur levels, the risk of hydrogen leaking through walls of the reactor increases. Besides, the total complex process is also expensive.

Hydrodesulfurization also has limitations in terms of the types of organsulfur compounds that it can remove. Mercaptans, thioethers, and disulfides, for example, are relatively easy to remove by the process, while other organosulfur compounds such as thiophene, benzothiophene, dibenzothiophene, other condensed-ring thiophenes, substituted, cyclic and aromatic versions of these compounds and asphaltenes are particularly difficult to remove by hydrodesulfurization. The reaction conditions needed to remove these compounds are so harsh that attempts to remove them often cause degradation of the fuel itself, thereby lowering the quality of the fuel.

Metal nanoparticles and small metal Atomic Quantum Clusters (AQCs) have been proposed as potential catalysts in desulfurization processes. Metal nanoparticles with dimensions from ~2-3 nm show smoothly scaling, size-dependent properties converging to the bulk when size increases. However, when particle size becomes comparable to the Fermi wavelength of an electron (~0.52 nm for gold or silver), properties are dramatically different from what would be expected from such scaling laws owing to their particular geometrical and electronic structures (Castleman and Khanna, *J. Phys. Chem. C* 2009, 113, 2664; and Bittner, *Surface Science Reports*, 2006, 61, 383). A number of new fascinating properties have appeared at this nanometer/sub-nanometer scale when transitioning from nanoparticles to AQCs. As an example, fluorescence (Zheng et al. *Phys. Rev. Lett.* 2004, 93, 77402; Santiago-Gonzalez et al. *Nano Lett.* 2010, 10, 4217; N. Vilar-Vidal et al. *J. Phys. Chem. C* 2010, 114, 15924; and Santiago-Gonzalez et al. *Nanoscale* 2012, 4, 7632), magnetism (Yamamoto et al. *Phys. Rev. Lett.* 2004, 93, 116801) and circular dichroism (Schaaff et al. *J. Phys. Chem. B* 2000, 104, 2630) have been already reported in small metal AQCs, $M_n$, with n<~100-200 atoms, and with sizes below ~1-2 nm. Novel catalytic properties are now evident in this AQC region (Huang et al. *Angew. Chem. Int. Ed.* 2009, 48, 7862; Zhu et al. *Adv. Mat.* 2010, 22, 1915; Vilar et al. *ACS Catal.* 2012, 2, 1693; Zhao et al. Angew. Chem. Int. Ed. 2006, 45, 4955; Selva et al. J. Am. Chem. Soc. 2010, 132, 6947; and WO2014/068163 A1). It has to be noted that the large catalytic activities found with small AQCs cannot be attributed to the increase of the surface area (or the fraction of available atoms for the catalytic reaction), but to the above-mentioned new electronic properties displayed by these AQCs (Zhu et al. *J. Mater. Chem.* 2011, 21, 6793).

Corma et al. described aerobic oxidation of thiols to disulfides by Au nanoparticles supported on $CeO_2$ (*Chem. Sci.* 2012, 3, 398). Some small Au atomic aggregates have been also reported to be efficient catalysts for the oxidation of thiols (Corma et al. *Nature Chem.* 2013, 5, 775). However, these oxidations processes are incomplete and lead to undesired disulfide compounds (sulfur in oxidation state −1), even for the most simple to oxidize organosulfur compounds, such as thiophenol (sulfur in oxidation state −2).

Sulfonates (sulfur in oxidation state +4) and sulfates (sulfur in oxidation state +6) are widespread in nature, and make up over 95% of the sulfur content of most aerobic soils. Many microorganisms can use sulfonates and sulfates as a source of sulfur for growth, even when they are unable to metabolize the carbon skeleton of the compounds. Therefore, it is desired for desulfurization of fossil fuels to completely oxidize organosulfur compounds to oxidation states $S^{+4}$ and $S^{+6}$.

In view of the above, there is an urgent necessity of developing new alternative processes able to remove all types of organic sulfur compounds present in fossil fuels.

BRIEF DESCRIPTION OF THE INVENTION

The authors of the present invention have unexpectedly found that metal AQCs having between 5 and 13 metal atoms can catalyze the complete oxidation of organosulfur compounds to sulfates at room temperature and atmospheric pressure. Indeed, the process of the present invention can oxidize the most difficult to oxidize organosulfur compounds present in hydrocarbon mixtures, i.e. thiophene-based compounds and asphaltenes.

Therefore, in a first aspect, the present invention refers to a process for oxidation of an organosulfur compound comprising the following steps:
  i) providing a catalyst comprising metal Atomic Quantum Clusters (AQCs) having between 5 and 13 metal atoms; wherein the metal of the metal Atomic Quantum Clusters (AQCs) is selected from Ag, Co, Cu, Pt, Fe, Pd, Ni or their bi-metal and multi-metal combinations; and
  ii) contacting the catalyst of step (i) with an organosulfur compound to oxidize said organosulfur compound; wherein the contacting of step (ii) is performed in a liquid having oxygen dissolved.

In a second aspect, the present invention refers to the use of metal AQCs having between 5 and 13 metal atoms as catalyst in oxidation of an organosulfur compound.

In a final aspect, the present invention is directed to a chemical composition comprising an organosulfur compound and metal AQCs having between 5 and 13 metal atoms.

FIGURES

FIG. 1. S-XANES spectrum of a) a dispersion of Ag AQCs and dibenzothiophene in THF-water deposited on graphite, b) $NaSO_4$ deposited on graphite and c) a dispersion of dibenzothiophene in THF-water deposited on graphite.

Figure 2:
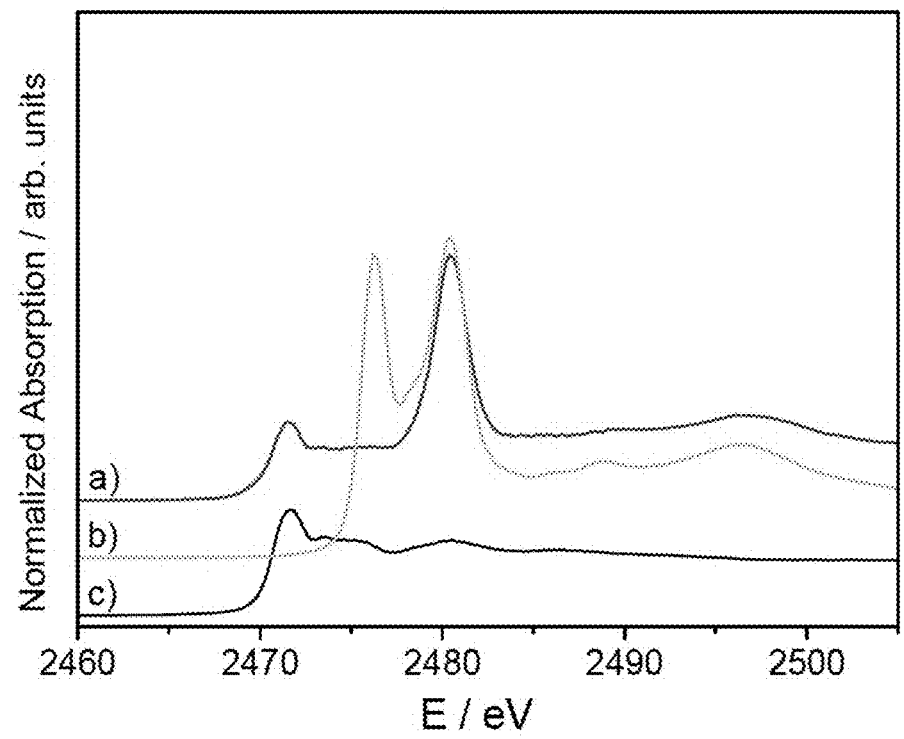

FIG. 2. S-XANES spectrum of a) a dispersion of Ag AQCs and tetrabenzothiophene in THF-water deposited on graphite, b) $NaSO_4$ deposited on graphite and c) a dispersion of tetrabenzothiophene in THF-water deposited on graphite.

Figure 3:
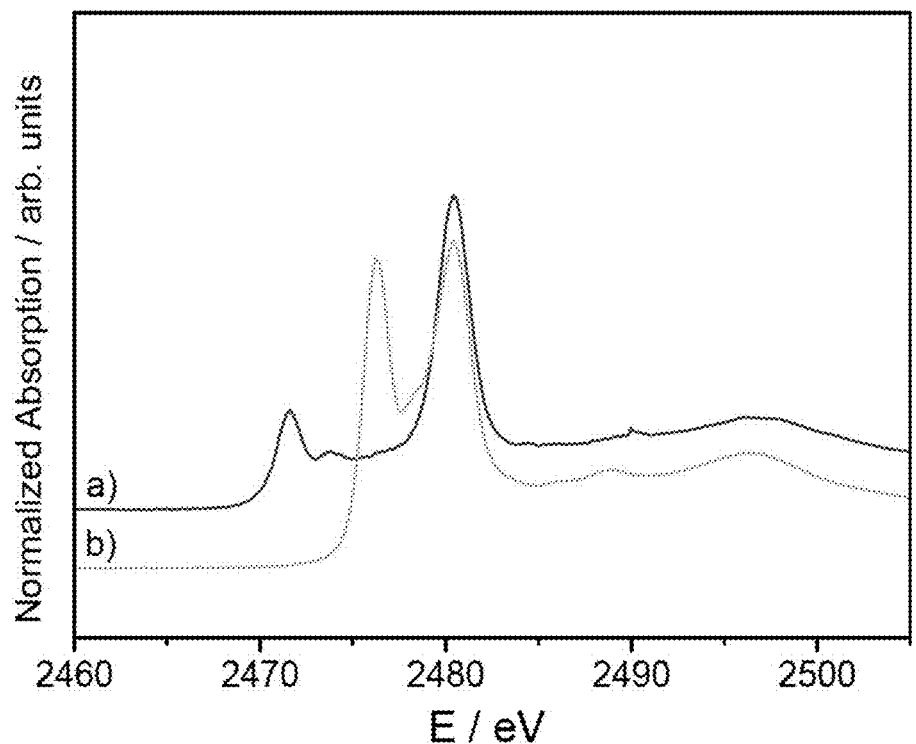

FIG. 3. S-XANES spectrum of a) a dispersion of dibenzothiophene in THF after being passed through Ag AQCs supported on graphite, b) $NaSO_4$ deposited on graphite.

Figure 4:
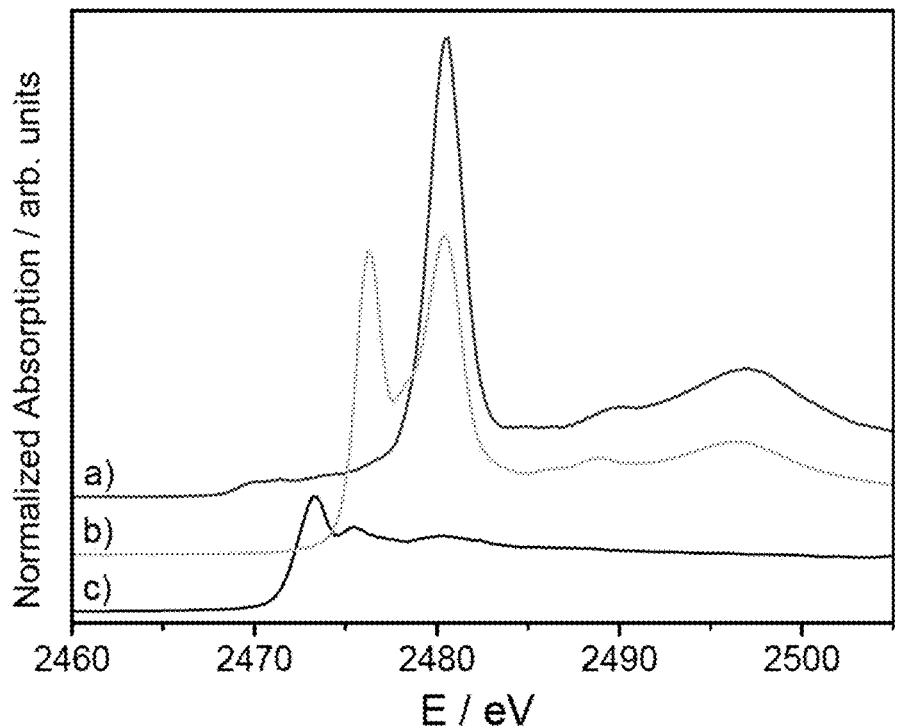

FIG. 4. S-XANES spectrum of a) a dispersion of asphaltene and Ag AQCs in toluene-water mixture deposited on graphite and, b) $NaSO_4$ deposited on graphite and c) a dispersion of asphaltene in toluene-water deposited on graphite.

Figure 5:
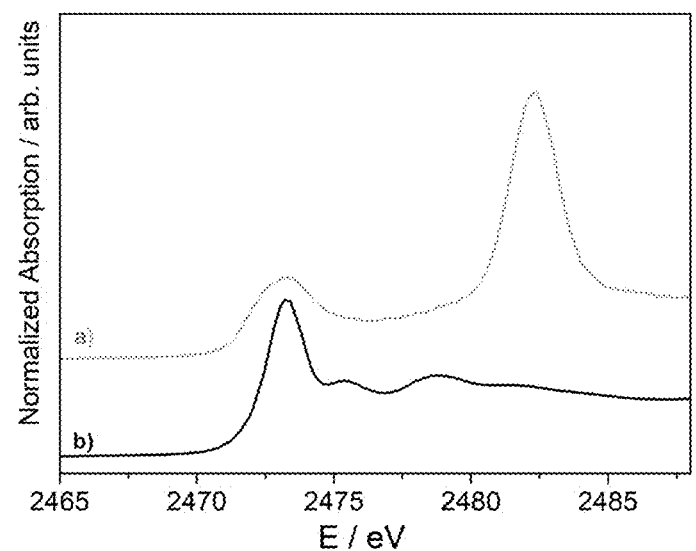

FIG. 5. S-XANES spectrum of a) a dispersion of dibenzothiophene and Cu AQCs in THF-water deposited on graphite and, b) a dispersion of dibenzothiophene in THF-water deposited on graphite.

Figure 6:
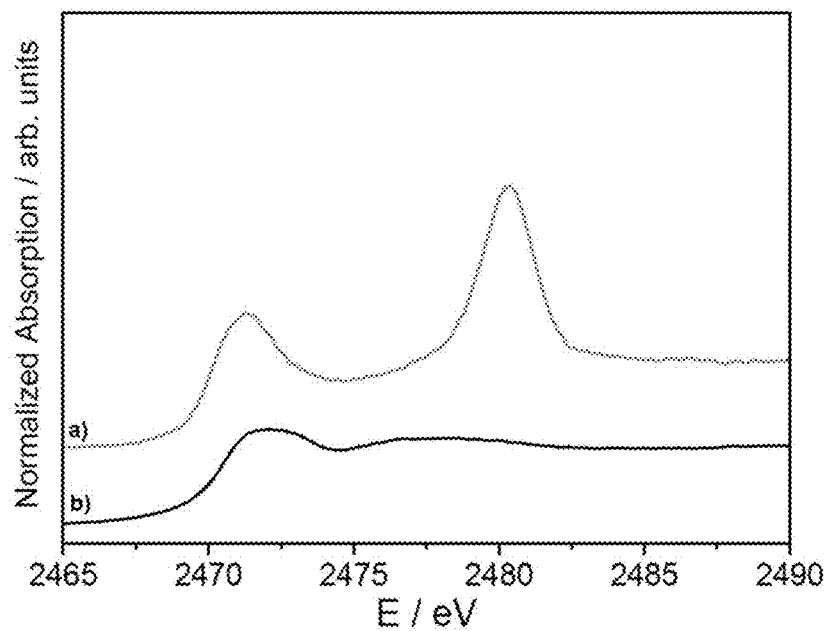

FIG. 6. S-XANES spectrum of a) a dispersion of thiantrene and Cu AQCs in THF-water deposited on graphite and b) a dispersion of thiantrene in THF-water deposited on graphite.

DETAILED DESCRIPTION OF THE INVENTION

Unless defined otherwise, all technical and scientific terms used herein have the same meaning as commonly understood to one of ordinary skill in the art to which this disclosure belongs.

As defined above, in a first aspect, the present invention refers to a process for oxidation of an organosulfur compound comprising the following steps:
  i) providing a catalyst comprising metal Atomic Quantum Clusters (AQCs) having between 5 and 13 metal atoms; wherein the metal of the metal Atomic Quantum Clusters (AQCs) is selected from Ag, Co, Cu, Pt, Fe, Pd, Ni or their bi-metal and multi-metal combinations; and
  ii) contacting the catalyst of step (i) with an organosulfur compound to oxidize said organosulfur compound; wherein the contacting of step (ii) is performed in a liquid having oxygen dissolved.

In the context of the present invention, the term "organosulfur compound" or "organic sulfur compound" refers to an organic compound that contains sulfur naturally present for example within fossil fuels, coal, petroleum and natural gas. As define above, their removal is a major focus of oil refineries. The most common organosulfur compounds present in all crude oil fractions are thiophene ($C_4H_4S$)-based compounds and asphaltenes. Non-limiting examples of organosulfur compounds suitable for the process of the present invention are thiol derivatives, sulfur-containing heterocyclic chemical compounds such as thiophene-based compounds, thianthrene, dibenzyl sulfide, phenyl sulfide and phenyl disulfide, asphaltenes and/or mixtures thereof; preferably thiol derivatives, thiophene-based compounds, thianthrene, dibenzyl sulfide, phenyl sulfide, phenyl disulfide, asphaltenes and/or mixtures thereof; more preferably thiophenol, thiophene, bithiophene, thienothiophene, benzothiophene, dibenzothiophene, tetrabenzothiophene, polythiophene, phenylthiophene, tetraphenylthiophene, thianthrene, dibenzyl sulfide, phenyl sulfide, phenyl disulfide, asphaltene and/or mixtures thereof; even more preferably dibenzothiophene, tetrabenzothiophene, asphaltene, thiantrene and/or mixtures thereof.

In a particular embodiment, the organosulfur compound used in the process of the present invention is selected from thiol derivatives, sulfur-containing heterocyclic chemical compounds, asphaltenes and mixtures thereof; more preferably from sulfur-containing heterocyclic chemical compounds, asphaltenes and mixtures thereof; more preferably from thiophenol, thiophene, bithiophene, thienothiophene, benzothiophene, dibenzothiophene, tetrabenzothiophene, polythiophene, phenylthiophene, tetraphenylthiophene, thianthrene, dibenzyl sulfide, phenyl sulfide, phenyl disulfide, asphaltenes and mixtures thereof.

In a more particular embodiment, the organosulfur compound used in the process of the present invention is selected from thiophene-based compounds, thiantrene, asphaltenes and mixtures thereof; preferably from thiophene-based compounds, asphaltenes and mixtures thereof.

The term "thiophene-based compounds" refers to a family of organic compounds having the thiophene structure included in their organic skeleton and which comprises aliphatic, cyclic and aromatic derivates. The term "thiophene" refers to a heterocyclic compound with the formula $C_4H_4S$ also commonly called thiofuran.

Non limiting examples of thiophene-based compounds suitable in the process of the present invention include thiophene, bithiophene, thienothiophene, benzothiophene, dibenzothiophene, tetrabenzothiophene, polythiophene, phenylthiophene and tetraphenylthiophene.

In a particular embodiment thiophene-based compounds suitable in the process of the present invention are selected from thiophene, bithiophene, thienothiophene, benzothiophene, dibenzothiophene, tetrabenzothiophene, polythiophene, phenylthiophene and tetraphenylthiophene; preferably selected from thiophene, dibenzothiophene, tetrabenzothiophene and tetraphenylthiophene.

The term "asphaltenes" refers to molecular substances that are found in crude oil, along with resins, aromatic hydrocarbons, and saturates (i.e. saturated hydrocarbons such as alkanes). Asphaltenes consist primarily of carbon, hydrogen, nitrogen, oxygen, and sulfur, as well as trace amounts of vanadium and nickel. The C:H ratio is approximately 1:1.2, depending on the asphaltene source. Asphaltenes are defined operationally as the n-heptane-insoluble, toluene-soluble component of a carbonaceous material such as crude oil, bitumen, or coal. Asphaltenes have been shown to have a distribution of molecular masses in the range of 400 u to 1500 u, but the average and maximum values are difficult to determine due to aggregation of the molecules in solution.

The process for oxidation of an organosulfur compound of the present invention comprises a step (i) of providing a catalyst comprising metal Atomic Quantum Clusters (AQCs) having between 5 and 13 metal atoms.

The term "Atomic Quantum Cluster", abbreviated as AQC, is understood as metal Atomic Quantum Cluster. Metal AQCs are formed exclusively by zero-oxidation-state metal atoms, $M_n$, with less than approximately 200 metal atoms ($M_n$, n<200), and with a size of less than 2 nm. The AQCs are stable over time. In addition, AQCs are known for no longer behaving like a "metal" and their behavior becomes molecular like. Therefore, new properties which are not observed in nanoparticles, microparticles or bulk metal appear in these clusters. Therefore, the physical-chemical properties of the AQC cannot be simply extrapolated from those of the nano/microparticles.

Metal AQCs suitable in the process of the present invention are further characterized by being made up of less than 200 metal atoms ($M_n$, n<200), preferably less than 100 metal atoms ($M_n$, n<100), more preferably between 5 and 13 metal atoms ($M_n$, 5≤n≤13) even more preferably 5 metal atoms ($M_n$, n=5).

The metal AQCs used in the process of the present invention are synthesized according to the process described in patent ES2277531, its corresponding WO 2007/017550 A1 and in documents N. Vilar-Vidal et al. [N. Vilar-Vidal et al. Small 2014, 10, No. 18, 3632-3636] and Huseyinova S. et al. [Huseyinova S. et al. J. Phys. Chem. C 2016, 120, 15902-15908]. The method for obtaining metal AQCs described in said documents are based on reduction of the salt or metal ion (metal salts or ions) while maintaining a kinetic control for a slow reduction and a low concentration of reagents in the reaction medium. Thus, the clustering formation is not limited to the type of synthesis, or the metallic element, for which reason any other chemical method of reduction of metal salts in solution can be used for the production of these AQCs, provided that the reaction slowdowns later enough as to observe the evolution of the AQC and stop the reaction (eg. by cooling, dilution and/or fixation/separation of the clusters of the reaction medium) at the time that interests one AQC of a determined size.

The metals of the metal AQCs suitable in the process of the present invention are transition metals, preferably the metals are selected from Au, Ag, Co, Cu, Pt, Fe, Pd, Ni or their bi-metal and multi-metal combinations, the metals are selected from Ag, Co, Cu, Pt, Fe, Pd, Ni or their bi-metal and multi-metal combinations, even more preferably are selected from Ag, Cu and a combination thereof. In a particular embodiment, the metals of the metal AQCs suitable in the process of the present invention are Ag or Cu.

The authors of the present invention has surprisingly observed that metal AQCs having between 5 and 13 metal atoms can completely oxidize the most difficult to oxidize organosulfur compounds, i.e., thiophene-based compounds and asphaltenes, to compounds of sulfur oxidation state +6.

Without being bound to any theory in particular it is believed that the surprising catalytic activity of AQCs as oxidation catalyst of organosulfur compounds is due to the oxygen adsorption and activation by the clusters, but detailed theoretical calculations, including the presence of solvent and oxygen, are needed to fully understand such exceptional catalytic activities.

In a preferred embodiment, the metal AQCs are monodispersed metal AQCs, more preferably monodispersed metal AQCs having 5 metal atoms, even more preferably the metal AQCs are monodispersed metal AQCs having 5 metal atoms with the exception of monodispersed Au AQCs having 5 metal atoms.

In addition, the metal AQCs as defined above can be provided as homogenous catalyst in dispersion, or as heterogeneous catalyst wherein the metal AQCs are supported in a support material.

As a non-limiting example, the metal AQCs supported on a support material can be prepared just by dropping the corresponding AQCs solution onto the support and left drying. The drying process can be alternatively done under vacuum to accelerate the process. Other standard supporting methods well-known in the technical field of the present invention can be also used such as spin coating an AQC solution onto planar substrates.

Non-limiting examples of suitable supports include carbon black, graphite, mesoporous carbon, graphene, graphene oxide, glassy carbon, silicium oxide, mesoporous silica, cerium oxide, titanium oxide, tin oxide, manganese oxide, zinc oxide, zirconium oxide, aluminium oxide, iron oxide, nickel oxide, cobalt oxide, zeolites, polytetrafluorethylene, polyethylene, reinforced plastics, steel and combinations thereof.

In a preferred embodiment, the support material is a solid with a high surface area.

In another preferred embodiment, the support material is graphite, more preferably porous graphite.

The process the present invention further comprises a step (ii) of contacting the catalyst of step (i) with the organosulfur compound to oxidize said organosulfur compound.

The expression "contacting" of step (ii) refers to a physical contact between the catalyst and the organosulfur compound.

In a particular embodiment, the contacting of step (ii) is performed in a liquid having oxygen dissolved. In the context of the present invention the term "liquid" refers to a solvent, a mixture of solvents or an organosulfur compound, suitable for the process of the present invention, in liquid phase having oxygen dissolved.

In a more particular embodiment, the contacting of step (ii) is performed in a solvent or in a mixture of solvents; preferably in a solvent or in a mixture of solvents having oxygen dissolved; more preferably in a solvent or in a mixture of solvents having oxygen dissolved at atmospheric pressure and at room temperature.

In a preferred embodiment, the contacting of step (ii) is performed in liquid phase having oxygen dissolved in a concentration of between 0.1 and 30 mg/l at room temperature and atmospheric pressure; preferably between 1 and 20 mg/l at room temperature and atmospheric pressure. In the context of the present invention the expression "room temperature" refers to what is commonly understood by an expert in the art.

The process for oxidation of an organosulfur compound of the present invention works at atmospheric pressure and room temperature, but, if necessary, oxygen pressure may be added to the solvent or mixture of solvents suitable for the process of the present invention by commonly known means in the art such as by introducing pressurized oxygen, preferably by introducing between 1 and 10 bars of pressurized $O_2$; more preferably by introducing between 3 and 7 bars of pressurized $O_2$; even more preferably by introducing about 5 bars of pressurized $O_2$.

In a more particular embodiment, the contacting of step (ii) is performed in a solvent or in a mixture of solvents having oxygen dissolved; wherein the oxygen dissolved has reached at least a 40% oxygen saturation, preferably at least a 70% oxygen saturation, more preferably at least a 90% oxygen saturation, even more preferably a 100% oxygen saturation. The oxygen saturation suitable for the process of the present invention can be achieved at a certain pressure and temperature by means commonly known by the expert in the art such as applying oxygen pressure.

In the context of the present invention the expression "oxygen saturation" refers to a relative measure of the concentration of oxygen that is dissolved or carried in a given liquid medium, such a solvent or a mixture of solvents, as a proportion of the maximal concentration that can be dissolved in that medium at a certain temperature and pressure, usually at room temperature and at atmospheric pressure and it is generally expressed as a percentage (%). It may be measured with a dissolved oxygen probe such as an oxygen sensor.

In even a more particular embodiment the contacting step (ii) is performed at room temperature and at atmospheric pressure. In a particular embodiment, the catalyst in step (ii) is used as homogenous catalyst in dispersion together with the organosulfur compound. Thus, in this particular embodiment, the contacting step (ii) is performed by physically mixing both the catalyst and the organosulfur compound in liquid phase by for example well-known mechanical devices, such as static mixers, rotor-stator systems, sonifiers and high-pressure homogenizers.

In another particular embodiment, the catalyst in step (ii) is used as heterogeneous catalyst, preferably as a supported catalyst, i.e., the metal AQCs are supported in a support material as defined above. Thus, in this particular embodiment, the contacting step (ii) is preferably performed by passing the organosulfur compound dispersed in a solvent through the metal AQCs supported in a support material.

Non-limiting examples of solvents suitable in the above defined particular embodiments include water, tetrahydrofurane (THF), dimetilsulphoxide (DMSO), ether, toluene, acetonitrile (ACN), alkanes, halogenated alkanes, cycloalkanes, fuels and mixtures thereof; preferably water and THF-water and toluene-water mixtures.

The authors of the present invention have surprisingly observed that after contacting as defined above the catalyst of step (i) with the organosulfur compound said organosulfur compound is effectively oxidized, particularly to sulfur oxidation states +4 (sulfones) and +6 (sulfates).

In a preferred embodiment, a sulfate is formed as a result of the oxidation of the organosulfur compound of step (ii).

In the context of the present invention, the term "sulfate" refers to either inorganic sulfate ($SO_4^{2-}$) or organic compounds in which one or two of the hydrogen atoms of sulfuric acid have been replaced by carbon-containing combining groups such as methyl ($CH_3$) or ethyl ($C_2H_5$).

In another preferred embodiment, the organosulfur compound of step (ii) is comprised within a hydrocarbon mixture, more preferably within petroleum or a petroleum-based fuel.

In the context of the present invention, the term "hydrocarbon mixture" refers to a mixture of organic compounds which are the result of a cracking process in the field of petroleum chemistry whereby complex organic molecules such as kerogens or long chain hydrocarbons are broken down into simpler molecules such as light hydrocarbons, by the breaking of carbon-carbon bonds in the precursors. The rate of cracking and the end products are strongly dependent on the temperature and presence of catalysts. Cracking is the breakdown of a large alkane into smaller, more useful alkanes and alkenes. Simply put, hydrocarbon cracking is the process of breaking a long-chain of hydrocarbons into short ones. This process might require high temperatures and high pressure.

The term "petroleum" refers to a naturally occurring, yellow-to-black liquid found in geological formations beneath the Earth's surface, which is commonly refined into various types of fuels. Components of petroleum are separated using a technique called fractional distillation. It consists of hydrocarbons of various molecular weights and other organic compounds such as organosulfur compounds. In the context of the present invention, term "petroleum" covers both naturally occurring unprocessed crude oil and petroleum products which are made up of refined crude oil, such as petroleum based-fuels.

The term "petroleum-based fuels" refers to the most common distillation fractions of petroleum and petroleum-derived products including, but not-limited to, naphtha, liquefied petroleum gas (LPG), butane, gasoline, jet fuel, kerosene, fuel oil and diesel fuel.

Thus, in another aspect, the present invention refers to a chemical composition comprising an organosulfur compound and metal AQCs having between 5 and 13 metal atoms.

In a particular embodiment, the chemical composition of the present invention comprises an organosulfur compound selected from thiol derivatives, sulfur-containing heterocyclic chemical compounds, asphaltenes and mixtures thereof, and metal AQCs having between 5 and 13 metal atoms; preferably the organosulfur compound is selected from sulfur-containing heterocyclic chemical compounds, asphaltenes and mixtures thereof; more preferably the organosulfur compound is selected from thiophenol, thiophene, bithiophene, thienothiophene, benzothiophene, dibenzothiophene, tetrabenzothiophene, polythiophene, phenylthiophene, tetraphenylthiophene, thianthrene, dibenzyl sulfide, phenyl sulfide, phenyl disulfide, asphaltenes and mixtures thereof; even more preferably the organosulfur compound is selected from dibenzothiophene, tetrabenzothiophene, asphaltene, thiantrene and mixtures thereof.

In a particular embodiment, the organosulfur compound of the present invention is selected from thiophene-based compounds, thiantrene, asphaltenes and mixtures thereof; preferably from thiophene-based compounds, asphaltenes and mixtures thereof.

In a preferred embodiment, the organosulfur compound of the chemical composition as defined above is comprised within a hydrocarbon mixture, more preferably within petroleum or a petroleum-based fuel.

In another preferred embodiment, the catalyst and the organosulfur compound of step (ii) are in a weight ratio higher than $1 \cdot 10^{-4}$.

In a preferred embodiment, the organosulfur compound of step (ii) is dispersed in a solvent.

Non-limiting examples of solvents suitable in the process of the present invention include water, tetrahydrofurane (THF), dimetilsulphoxide (DMSO), ether, toluene, acetonitrile (ACN), alkanes, halogenated alkanes, cycloalkanes, fuels and mixtures thereof; preferably water and THF-water and toluene-water mixtures.

In a preferred embodiment, the step (ii) of the process of the present invention is performed at room temperature and atmospheric pressure.

This is an important advantage over the desulfurization methods of the prior art since normally harsh reaction conditions are needed so they often cause degradation of the fuel itself, thereby lowering the quality of the fuel and make the process expensive.

As explained above, metal AQCs have surprisingly shown a great efficiency as oxidation catalyst of organosulfur compounds. In particular, metal AQCs having between 5 and 13 metal atoms can be used to completely oxidize the most difficult to oxidize organosulfur compounds to compounds having sulfur in oxidation state +6.

Thus, in another aspect, the present invention is directed to the use of metal AQCs having between 5 and 13 metal atoms as catalyst in oxidation of organosulfur compounds.

In a particular embodiment, the use of metal AQCs having between 5 and 13 metal atoms as catalyst in oxidation of organosulfur compounds; wherein the organosulfur compound is selected from thiol derivatives, sulfur-containing heterocyclic chemical compounds, asphaltenes and mixtures thereof; preferably the organosulfur compound is selected from sulfur-containing heterocyclic chemical compounds, asphaltenes and mixtures thereof; more preferably the organosulfur compound is selected from thiophenol, thiophene, bithiophene, thienothiophene, benzothiophene, dibenzothiophene, tetrabenzothiophene, polythiophene, phenylthiophene, tetraphenylthiophene, thianthrene, dibenzyl sulfide, phenyl sulfide, phenyl disulfide, asphaltenes and mixtures thereof; even more preferably the organosulfur compound is selected from dibenzothiophene, tetrabenzothiophene, asphaltene, thiantrene and mixtures thereof.

In a particular embodiment, the organosulfur compound of the present invention is selected from thiophene-based compounds, thiantrene, asphaltenes and mixtures thereof; preferably from thiophene-based compounds, asphaltenes and mixtures thereof.

EXAMPLES

The present invention will now be described by way of examples which serve to illustrate the construction and testing of illustrative embodiments. However, it is understood that the present invention is not limited in any way to the examples below.

Example 1. Oxidation of Dibenzothiophene Using Ag AQCs

5 µg of monodispersed Ag AQCs of 5 metal atoms dispersed in THF-water were mixed with 20 mg of dibenzothiophene. FIG. 1a shows the S-XANES spectrum of this dispersion after been deposited on porous graphite acting only as S-XANES support. It is observed that dibenzothiophene is completely oxidized to sulphate-like species after 10 minutes at atmospheric pressure and room temperature, as it can be observed by comparison with the $NaSO_4$ S-XANES spectrum in FIG. 1b. The reference of the S-XANES of the dibenzothiophene compound without clusters is included in FIG. 1c.

Example 2. Oxidation of Tetrabenzothiophene Using Ag AQCs

5 µg of monodispersed Ag AQCs of 5 metal atoms dispersed in THF-water were mixed with 20 mg of tetra-benzothiophene. FIG. 2a shows the S-XANES spectrum of this dispersion after been deposited on porous graphite acting only as S-XANES support. It is observed that tetrabenzothiophene is completely oxidized to sulphate-like species after 10 minutes at atmospheric pressure and room temperature, as it can be observed by comparison with the $NaSO_4$ S-XANES spectrum of FIG. 2b. The reference of the S-XANES of the tetrabenzothiophene compound without clusters is included in FIG. 2c.

Example 3. Oxidation of Dibenzothiophene Using Supported Ag AQCs 0.1 µg of monodispersed Ag AQCs of 5 metal atoms in water were dropped onto a porous graphite support and dried under vacuum. Then, 1 mg of dibenzothiophene dispersed in THF was passed through the Ag AQCs/graphite support. FIG. 3a shows the S-XANES spectrum of this sample. It is observed that dibenzothiophene is completely oxidized to sulphate-like species after 10 minutes at atmospheric pressure and room temperature, as it can be observed by comparison with the $NaSO_4$ S-XANES spectrum of FIG. 3b. The reference of the S-XANES of the dibenzothiophene compound without clusters can be seen in FIG. 1c.

Example 4. Oxidation of Asphaltene Using Supported Ag AQCs

5 µg of monodispersed Ag AQCs of 5 metal atoms were dispersed in toluene-water mixture together with 20 mg of asphaltene. FIG. 4a shows the S-XANES spectrum of this dispersion after been deposited on porous graphite. It is observed that asphaltene is completely oxidized to sulphate-like species after 10 minutes at atmospheric pressure and room temperature, as it can be observed by comparison with the $NaSO_4$ S-XANES spectrum of FIG. 4b. The reference of the S-XANES of the asphaltene compound without clusters is included in FIG. 4c.

Example 5. Oxidation of Dibenzothiophene Using Cu AQCs

30 µg of monodispersed Cu AQCs of 5 metal atoms were dispersed in THF-water with 20 mg of dibenzothiophene. FIG. 5a shows the S-XANES spectrum of this dispersion after been deposited on porous graphite. It is observed that dibenzothiophene is completely oxidized to sulphate-like species after 10 minutes at atmospheric pressure and room temperature, as it can be observed by comparison with the $NaSO_4$ S-XANES spectrum of FIG. 5b. The reference of the S-XANES of the dibenzothiophene compound without clusters is included in FIG. 1c.

Example 6. Oxidation of Thiantrene Using Cu AQCs 3.5 µg of monodispersed Cu AQCs of 5 metal atoms dispersed in THF-water were mixed with 20 mg of thiantrene. FIG. 6a shows the S-XANES spectrum of this dispersion after been deposited on porous graphite. It is observed that thiantrene is almost completely oxidized to sulphate-like species after 10 minutes at atmospheric pressure and room temperature. The reference of the S-XANES of the thiantrene compound without clusters is included in FIG. 6b. Therefore, it was confirmed that metal AQCs can completely oxidize thiophene-based compounds, asphaltenes and other organosulfur compounds such as thiantrene, to sulfates.

The invention claimed is:

1. A process for oxidation of an organosulfur compound comprising the following steps:
   i) providing a catalyst comprising metal Atomic Quantum Clusters (AQCs) consisting of between 5 and 13 metal atoms; wherein the metal of the metal Atomic Quantum Clusters (AQCs) is selected from Ag, Co, Cu, Pt, Fe, Pd, Ni or their bi-metal and multi-metal combinations; and
   ii) contacting the catalyst of step (i) with an organosulfur compound to oxidize said organosulfur compound;
   wherein the contacting of step (ii) is performed in a liquid having oxygen dissolved;
   wherein the step (ii) is performed at room temperature and atmospheric pressure; and
   wherein the organosulfur compound is selected from sulfur-containing heterocyclic chemical compounds, asphaltenes and mixtures thereof.

2. A process for oxidation of an organosulfur compound as defined in claim 1, wherein the metal of the metal AQCs is selected from Ag, Cu and combinations thereof.

3. A process for oxidation of an organosulfur compound as defined in claim 1, wherein the metal AQCs have 5 metal atoms.

4. A process for oxidation of an organosulfur compound as defined in claim 1, wherein the metal AQCs is supported in a support material.

5. A process for oxidation of an organosulfur compound as defined in claim 1, wherein the contacting step (ii) is performed by mixing the catalyst and the organosulfur compound in a solvent or in a mixture of solvents.

6. A process for oxidation of an organosulfur compound as defined in claim 1, wherein the contacting step (ii) is performed by passing the organosulfur compound dispersed in a solvent through the catalyst, wherein the catalyst comprises the metal AQCs supported in a support material.

7. A process for oxidation of an organosulfur compound as defined in claim 1, wherein the organosulfur compound of step (ii) is comprised within a hydrocarbon mixture.

8. A process for oxidation of an organosulfur compound as defined in claim 1, wherein the organosulfur compound is selected from thiophene, bithiophene, thienothiophene, benzothiophene, dibenzothiophene, tetrabenzothiophene, polythiophene, phenylthiophene, tetraphenylthiophene, thianthrene, dibenzyl sulfide, phenyl sulfide, phenyl disulfide, asphaltenes and mixtures thereof.

9. A process for oxidation of an organosulfur compound as defined in claim 1, wherein a sulfate is formed as a result of the oxidation of the organosulfur compound of step (ii).

10. A process for oxidation of an organosulfur compound as defined in claim 1, wherein the catalyst of step (i) is a homogeneous catalyst in dispersion.

* * * * *